United States Patent
Behnert et al.

(10) Patent No.: US 12,427,837 B2
(45) Date of Patent: Sep. 30, 2025

(54) HEATING PUMP SYSTEM

(71) Applicant: MAHLE International GmbH, Stuttgart (DE)

(72) Inventors: Dominik Behnert, Leonberg (DE); Markus Boger, Stuttgart (DE); Matthias Jung, Stuttgart (DE)

(73) Assignee: Mahle International GmbH (DE)

( * ) Notice: Subject to any disclaimer, the term of this patent is extended or adjusted under 35 U.S.C. 154(b) by 382 days.

(21) Appl. No.: 18/074,450

(22) Filed: Dec. 2, 2022

(65) Prior Publication Data
US 2023/0173890 A1   Jun. 8, 2023

(30) Foreign Application Priority Data
Dec. 3, 2021 (DE) .................. 102021213795.4

(51) Int. Cl.
*B60H 1/32*     (2006.01)
*F25B 41/20*    (2021.01)
*F25B 41/31*    (2021.01)

(52) U.S. Cl.
CPC ....... *B60H 1/32281* (2019.05); *B60H 1/3213* (2013.01); *F25B 41/20* (2021.01); *F25B 41/31* (2021.01); *F25B 2400/04* (2013.01)

(58) Field of Classification Search
CPC ... B60H 1/32281; B60H 1/3213; F25B 41/31; F25B 41/20; F25B 2400/04
See application file for complete search history.

(56) References Cited

U.S. PATENT DOCUMENTS

| 10,293,660 B2 | 5/2019 | Ohishi |
| 10,520,231 B2 | 12/2019 | Itou |
| 2023/0339293 A1* | 10/2023 | Durrani .............. B60H 1/00921 |

FOREIGN PATENT DOCUMENTS

| DE | 112016000605 T5 | 10/2017 |
| DE | 112016003519 T5 | 4/2018 |
| DE | 112019006280 T5 | 9/2021 |
| FR | 3077374 A1 | 8/2019 |

OTHER PUBLICATIONS

English abstract for DE-112019006280.
English abstract for FR-3077374.

* cited by examiner

*Primary Examiner* — Larry L Furdge
(74) *Attorney, Agent, or Firm* — Fishman Stewart PLLC

(57) ABSTRACT

A heat pump system for a motor vehicle is disclosed. The heat pump system includes a refrigerant circuit that is flowable through by a refrigerant. The refrigerant circuit has a first partial circuit with a low pressure accumulator, a compressor, a heat pump heater, and an exterior heat exchanger. The refrigerant circuit has a second partial circuit with an evaporator and a chiller. The refrigerant circuit has a valve arrangement. The first partial circuit and the second partial circuit are fluidically connected with one another exclusively via the valve arrangement.

20 Claims, 3 Drawing Sheets

HEATING PUMP SYSTEM

CROSS-REFERENCE TO RELATED APPLICATION

This application claims priority to German Application No. DE 10 2021 213 795.4 filed on Dec. 3, 2021, the contents of which are hereby incorporated by reference in its entirety.

TECHNICAL FIELD

The invention relates to a heat pump system for a motor vehicle.

BACKGROUND

A heat pump system can be used in particular for an energy-efficient heating of an electrified motor vehicle. Here, the heat pump system uses the waste heat of the motor vehicle and/or the heat of the environment as a heat source, and a refrigerant as heat carrier. Disadvantageously, such a heat pump system has a plurality of components which is associated with high costs. The said costs are also caused in particular by the valves and lines which are used in the heat pump system. In addition, such a heat pump system has a high installation space requirement.

It is therefore the object of the invention to indicate for a heat pump system of the generic type an improved or at least alternative embodiment, in which the described disadvantages are overcome.

This problem is solved according to the invention by the subject matter of the independent claim(s). Advantageous embodiments are the subject of the dependent claims.

SUMMARY

The present invention is based on the general idea of producing, through an intelligent interconnection of the heat exchangers, a heat pump system, optimized with regard to installation space and cost, on the basis of a low pressure accumulator. The heat pump system according to the invention is provided for a motor vehicle. The heat pump system has here a refrigerant circuit, able to be flowed through by a refrigerant, with a first partial circuit and a second partial circuit. The first partial circuit comprises a low pressure accumulator, a compressor, a heat pump heater and an exterior heat exchanger. The second partial circuit comprises an evaporator and a chiller. According to the invention, the refrigerant circuit has a valve arrangement, wherein the first partial circuit and the second partial circuit are fluidically connected with one another exclusively via the valve arrangement.

In the heat pump system according to the invention, the two partial circuits are connected in a fluid-conducting manner by means of the valve arrangement. The first partial circuit and the second partial circuit are able to be flowed through by the refrigerant and can be interconnected to one another in a differing manner through the valve arrangement. Thus, the heat pump system can be operated in a cooling mode, in a first heating mode and in a second heating mode, as is explained more closely below. Advantageously, the valve arrangement can have at least one sensor for the detecting of pressure and/or temperature of the refrigerant. Based thereon, the heat pump system can then be connected.

The heat pump heater can be a refrigerant-air heat exchanger. In particular, the heat pump heater can form a part of an air-conditioning system of the motor vehicle. Here, the heat pump heater can be used for heat exchange between the refrigerant and an interior air which flows in an air-conditioning system of the motor vehicle to an interior of the motor vehicle. Accordingly, in this case the heat pump heater is configured to be able to be flowed through by the refrigerant and by the interior air.

The exterior heat exchanger can be a refrigerant-air heat exchanger and can be used for heat exchange between the refrigerant and the ambient air, which flows outside the motor vehicle. Accordingly, in this case the exterior heat exchanger is configured to be able to be flowed through by the refrigerant and by the ambient air.

The evaporator can be a refrigerant-air heat exchanger. In particular, the evaporator can form a part of an air-conditioning system of the motor vehicle. Here, the evaporator can be used for heat exchange between the refrigerant and an interior air which flows in an air-conditioning system of the motor vehicle to an interior of the motor vehicle. Accordingly, in this case the evaporator is configured to be able to be flowed through by the refrigerant and by the interior air.

Advantageously, the valve arrangement can be securely connected to the low pressure accumulator, so that a separate structural unit is formed which is structurally cohesive and in particular is able to be, or respectively is, prefabricated. In the valve arrangement at least one valve and several lines of the heat pump system can be interconnected with one another. The valve arrangement and accordingly the at least one valve are securely connected to the low pressure accumulator, wherein the at least one valve is preferably flanged onto the low pressure accumulator. As the at least one valve and the lines with the low pressure accumulator are combined to the separate structurally cohesive structural unit, the number of components in the heat pump system and thereby the costs of the heat pump system can be reduced. Through the separate structurally cohesive structural unit, in addition the heat pump system is constructed in a particularly space-saving and compact manner. This structural unit can also be prefabricated, whereby a mounting- and production process can be separated out.

Advantageously, the heat pump system can have at least one coolant circuit, wherein the at least one coolant circuit can be connected to the refrigerant circuit in a heat-transferring manner via the chiller of the second partial circuit. The chiller can therefore be a refrigerant-coolant heat exchanger and can be used for heat exchange between the refrigerant and a coolant, which flows in the at least one coolant circuit of the heat pump system. Accordingly, in this case, the chiller is configured so as to be able to be flowed through by the refrigerant and by the coolant. The at least one coolant circuit can be used for example for cooling further components of the motor vehicle—such as a battery, for example.

Advantageously, provision can be made that the low pressure accumulator, the compressor, the heat pump heater and the exterior heat exchanger in the first partial circuit are connected to one another via a first partial circuit line in a fluid-conducting and serial manner. The first partial circuit line is connected here in a fluid-conducting manner with the valve arrangement at a first partial circuit inlet, arranged upstream of the low pressure accumulator and at a first partial circuit outlet, arranged downstream of the exterior heat exchanger. In the first partial circuit, the exterior heat exchanger is able to be flowed around via a bypass line. The bypass line is connected here to the valve arrangement in a fluid-conducting manner at a bypass inlet, arranged upstream of the exterior heat exchanger and at a bypass outlet. In the first partial circuit therefore the first partial circuit inlet, the low pressure accumulator, the compressor, the heat pump heater, the exterior heat exchanger and the first partial circuit outlet are able to be flowed through in succession. In addition, the exterior heat exchanger can be bypassed via the bypass line. The first partial circuit inlet, the first partial circuit outlet and the bypass outlet are fluidically connected here to the valve arrangement, so that the valve arrangement can regulate the flowing of the refrigerant through the bypass line and the first partial circuit line.

Advantageously, provision can be made that in the second partial circuit the evaporator and the chiller are connected to one another in a fluid-conducting and parallel manner via a second partial circuit line. The second partial circuit line is then connected to the valve arrangement in a fluid-conducting manner at a second partial circuit inlet arranged upstream of the evaporator and the chiller, and at a second partial circuit outlet arranged downstream of the evaporator and the chiller. In the second partial circuit therefore the chiller and the evaporator are able to be flowed through parallel to one another. The second partial circuit inlet and the second partial circuit outlet are fluidically connected to the valve arrangement here, so that the valve arrangement can regulate the flowing of the refrigerant through the second partial circuit line.

In addition, the heat pump system can have an expansion valve which is able to be regulated, which is arranged upstream of the exterior heat exchanger. Furthermore, provision can be made that the heat pump system has a regulatable expansion valve, arranged directly upstream of the chiller, and a regulatable expansion valve, arranged directly upstream of the evaporator. The term "directly" means here that no further functional components are connected between the respective expansion valve and the exterior heat exchanger or the evaporator or the chiller. The flowing of the refrigerant can be influenced by the respective expansion valve. Thus, the respective expansion valve can be opened or closed or can form a throttle. The respective expansion valve can be, for example, an electric expansion valve.

The heat pump system can be operable advantageously in a cooling mode. In the cooling mode, the expansion valve is opened, in a throttle-free manner, at the exterior heat exchanger. The expansion valve at the chiller and the expansion valve at the evaporator, on the other hand, form respectively a throttle. Through the valve arrangement in addition the bypass line in the first partial circuit is closed; the first partial circuit outlet is fluidicallly connected to the second partial circuit inlet; and the second partial circuit outlet is fluidically connected to the first partial circuit inlet.

The through-flowing of the heat pump system in the cooling mode is now explained more closely. In the first partial circuit, the refrigerant flows through the compressor after the low pressure accumulator and is compressed. Thereafter, the refrigerant flows to the heat pump heater. The heat pump heater can be a part of an air-conditioning system of the motor vehicle, wherein in the cooling mode no heat emission is to take place in the heat pump heater. The heat pump heater is accordingly not flowed through by air and is consequently passive with respect to heat transfer. Therefore, no heat exchange takes place between the refrigerant and the interior air in the heat pump heater. In the cooling mode, the bypass line is closed and the expansion valve at the exterior heat exchanger is opened. Accordingly, the complete refrigerant flows after the heat pump heater through the exterior heat exchanger, in which a heat emission takes place to the ambient air. The exterior heat exchanger is therefore operated as a condenser and the refrigerant is liquefied in the exterior heat exchanger. The liquefied refrigerant subsequently flows out from the first partial circuit at the first partial circuit outlet and is directed through the valve arrangement to the second partial circuit inlet. Via the second partial circuit inlet, the refrigerant flows to the chiller and to the evaporator. Here, the refrigerant is throttled through the expansion valves at the chiller and the evaporator, so that a transition takes place to the low pressure and to the lower temperature in the refrigerant. Thereby, the refrigerant can evaporate in the chiller and in the evaporator with corresponding heat absorption. The chiller can be linked to a coolant circuit in a heat-transferring manner and through the said heat absorption a coolant flowing in the coolant circuit can be cooled. The coolant circuit can be used for example for the cooling of further components of the motor vehicle—such as for example a battery. The evaporator can be a part of an air-conditioning system of the motor vehicle and interior air for an interior of the motor vehicle flowing in the air-conditioning system can be cooled through the said heat absorption. Subsequently, the refrigerant flows out from the chiller and the evaporator to the second partial circuit outlet and out from the second partial circuit at the second partial circuit outlet into the valve arrangement. Through the valve arrangement, the refrigerant is now directed again into the first partial circuit to the low pressure accumulator.

Alternatively, the heat pump system can be operable in a first heating mode. In the first heating mode, the expansion valve at the exterior heat exchanger and the expansion valve at the chiller form respectively a throttle. The expansion valve at the evaporator, on the other hand, is closed and thereby the flowing through of the evaporator with the refrigerant is prevented. Through the valve arrangement in addition the bypass outlet is fluidically connected with the second partial circuit inlet; and the first partial circuit outlet and the second partial circuit outlet are fluidically connected with the first partial circuit inlet.

The through-flowing of the heat pump system in the first heating mode is now explained more closely. In the first partial circuit the refrigerant flows through the compressor after the low pressure accumulator and is compressed. Thereafter, the refrigerant flows at a high pressure and a high temperature into the heat pump heater. In the first heating mode, the heat pump heater is used as a condenser. In the heat pump heater, heat is extracted from the refrigerant, and the refrigerant is condensed. The heat pump heater can be a part of an air-conditioning system of the motor vehicle and, through the said heat emission, interior air flowing in the air-conditioning system can be heated for an interior of the motor vehicle. The refrigerant which is condensed and liquefied in the heat pump heater now flows further to the bypass inlet. In the first heating mode, the expansion valve at the exterior heat exchanger forms a throttle and the bypass line is opened. Accordingly, a first part of the refrigerant flows via the bypass line to the bypass outlet and is directed through the valve arrangement to the second partial circuit inlet. In the second partial circuit, the expansion valve, which is arranged upstream of the evaporator, is closed and the evaporator is not flowed through. The first part of the refrigerant now flows exclusively via the chiller and is throttled by the expansion valve, arranged upstream of the chiller, so that a transition takes place to the low pressure and to the lower temperature in the refrigerant. Subsequently, the first part of the refrigerant evaporates in the chiller with corresponding heat absorption. The said heat absorption at the chiller can be used here in an analogous manner to the cooling mode for cooling the coolant. Subsequently, the refrigerant flows to the second partial circuit outlet and is directed through the valve arrangement to the first partial circuit inlet. From there, the refrigerant now flows in the first partial circuit to the low pressure accumulator. A second part of the coolant is throttled via the expansion valve at the exterior heat exchanger and subsequently evaporates in the exterior heat exchanger. After the exterior heat exchanger, the refrigerant flows to the first partial circuit outlet and is directed through the valve arrangement to the first circuit inlet. From there, the refrigerant now flows in the first partial circuit to the low pressure accumulator.

Alternatively, the heat pump system can be operable in a second heating mode. In the second heating mode, the expansion valve at the exterior heat exchanger, and thereby the first partial circuit outlet, are closed. The expansion valve at the chiller forms a throttle and the expansion valve at the evaporator is closed. Through the valve arrangement in addition the bypass outlet is fluidically connected to the second partial circuit inlet; and the second partial circuit outlet is fluidically connected to the first partial circuit inlet.

The through-flowing of the heat pump system in the second heating mode is now explained more closely. In the second heating mode, the expansion valve at the exterior heat exchanger and the first partial circuit outlet are closed. Accordingly, in contrast to the first heating mode, the complete refrigerant flows via the bypass line to the bypass outlet. Otherwise, the second heating mode corresponds to the first heating mode. The second heating mode can be advantageous in particular when the temperature of a coolant at the chiller is higher than the temperature of the ambient air at the exterior heat exchanger. The said differences in temperature levels between air and coolant can otherwise lead in the first heating mode to an undesired refrigerant relocation into the exterior heat exchanger. In the second heating mode, the exterior heat exchanger can be switched off and thereby the undesired refrigerant relocation can be ruled out. In the second heating mode therefore the chiller is used as the sole heat source.

In an advantageous embodiment, the valve arrangement can have a first 2/1-way valve, a second 2/1-way valve and a non-return valve. The first 2/1-way valve can interconnect the first partial circuit outlet and the first partial circuit inlet with one another. Here, the second 2/1-way valve can interconnect the bypass outlet and the second partial circuit inlet with one another. In addition, the non-return valve can fluidically connect a connection point arranged upstream of the first 2/1-way valve and a connection point arranged downstream of the second 2-1-way valve. In addition, the second partial circuit outlet is fluidically connected to the first partial circuit inlet at a connection point arranged downstream of the first 2/1-way valve.

In an alternative embodiment, the valve arrangement can have a 2/1-way valve and a 3/2-way valve. The 2/1-way valve can then interconnect the bypass outlet and the second partial circuit inlet with one another. The 3/2-way valve can interconnect with one another the first partial circuit outlet, the first partial circuit inlet and a connection point arranged downstream of the 2/1-way valve. In addition, the second partial circuit outlet can be fluidically connected to the first partial circuit inlet at a connection point arranged downstream of the 3/2-way valve.

In a further alternative embodiment, the valve arrangement can have a 4-way valve. Here, the 4-way valve can interconnect with one another the first partial circuit outlet, the first partial circuit inlet, the bypass outlet and the second partial circuit inlet. In addition, the second partial circuit outlet can be fluidically connected to the first partial circuit inlet at a connection point arranged downstream of the 4-way valve.

Independently of the embodiment which is described here, the valve arrangement can connect the refrigerant circuit of the heat pump system such that the heat pump system is operable in the modes described above. However, it shall be understood that the embodiments of the valve arrangement which are described here are not conclusive.

Further important features and advantages of the invention will emerge from the subclaims, from the drawings and from the associated figure description with the aid of the drawings.

It shall be understood that the features mentioned above and to be explained further below are able to be used not only in the respectively indicated combination, but also in other combinations or in isolation, without departing from the scope of the present invention.

Preferred example embodiments of the invention are illustrated in the drawings and are explained more closely in the following description, wherein the same reference numbers refer to identical or similar or functionally identical components.

BRIEF DESCRIPTION OF THE DRAWINGS

There are shown, respectively schematically

DETAILED DESCRIPTION

Figure 1:
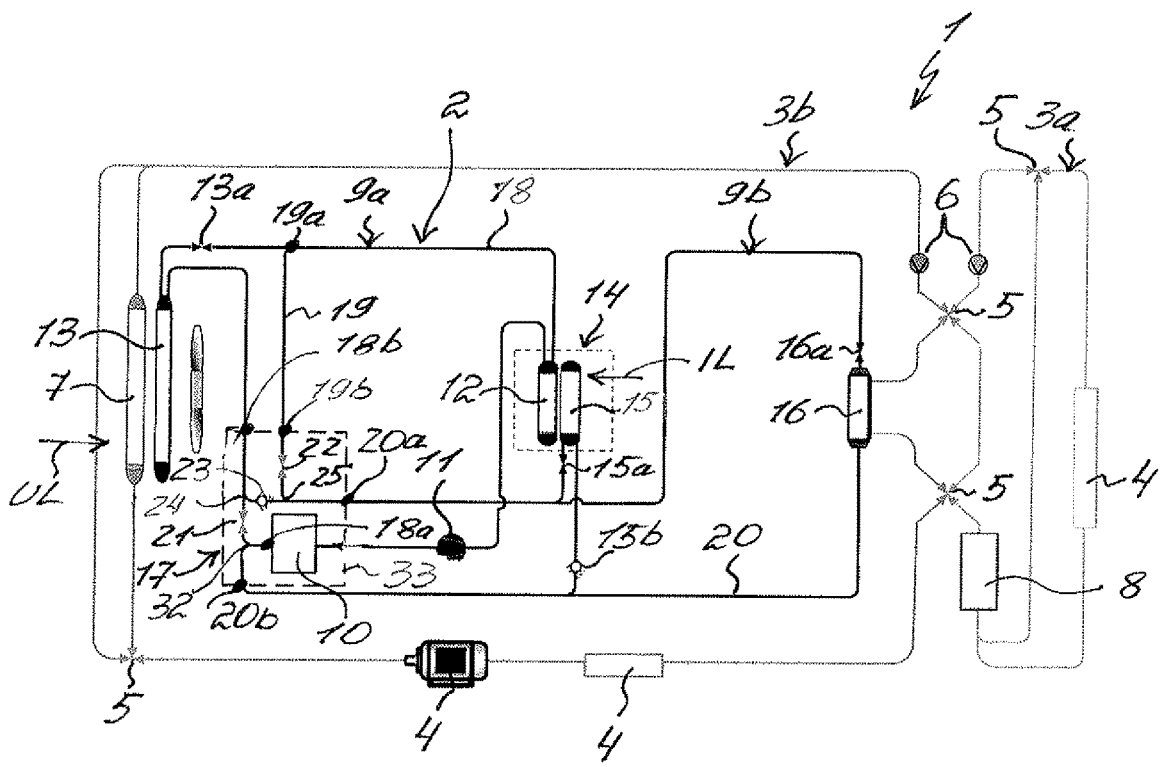
FIG. 1 a circuit diagram of a heat pump system according to the invention.

FIG. 1 shows a circuit diagram of a heat pump system 1 according to the invention for a motor vehicle. The heat pump system 1 has here a refrigerant circuit 2, able to be flowed through by a refrigerant, and two coolant circuits 3a and 3b, able to be flowed through by a coolant. The coolant circuits 3a and 3b are provided for the cooling of components 4 of the motor vehicle. The coolant circuits 3a and 3b comprise here several valves 5, several pumps 6, a coolant cooler 7 and a heater 8. The two coolant circuits 3a and 3b are able to be fluidically connected to one another via valves 5, so that the coolant can be cooled in the shared coolant cooler 7. However, the two coolant circuits 3a and 3b are also fluidically separable from one another via valves 5. The two coolant circuits 3a and 3b are connected to the refrigerant circuit 2 in a heat-transferring manner, as is explained more closely in the following.

The refrigerant circuit 2 has a first partial circuit 9a and a second partial circuit 9b.

The first partial circuit 9a comprises here a low pressure accumulator 10, a compressor 11, a heat pump heater 12 and an exterior heat exchanger 13. The heat pump heater 12 is a refrigerant-air heat exchanger and forms a part of an air-conditioning system 14 of the motor vehicle. The heat pump heater 12 is accordingly formed for heat exchange between the refrigerant and an interior air IL flowing in the air-conditioning system 14 to the interior. The exterior heat exchanger 13 is a refrigerant-air heat exchanger and is configured for heat exchange between the refrigerant and an ambient air UL. In the first partial circuit 9a, a regulatable expansion valve 13 is arranged directly upstream of the exterior heat exchanger 13.

The second partial circuit 9b comprises an evaporator 15 and a chiller 16. A regulatable expansion valve 15a is arranged upstream of the evaporator 15, and a regulatable expansion valve 16a is arranged upstream of the chiller 16. In addition, a non-return valve 15b is arranged directly downstream of the evaporator 15. The evaporator 15 is a refrigerant-air heat exchanger and forms a part of the air-conditioning system 14 of the motor vehicle. The evaporator 15 is configured here for heat exchange between the refrigerant and the interior air IL in the air-conditioning system 14. The chiller 16 is a refrigerant-coolant heat exchanger and is provided for heat exchange between the refrigerant and the coolant in the coolant circuits 3a and 3b. The refrigerant circuit 2 and the coolant circuits 3a and 3b are therefore connected to one another in a heat-transferring manner in the heat pump system 1 via the chiller 16.

The refrigerant circuit 2 has, in addition, a valve arrangement 17, wherein the first partial circuit 9a and the second partial circuit 9b are fluidically connected to one another exclusively via the valve arrangement 17.

In the first partial circuit 9a, the low pressure accumulator 10, the compressor 11, the heat pump heater 12 and the exterior heat exchanger 13 are connected to one another in a fluid-directing and serial manner via first partial circuit line 18. The first partial circuit line 18 is connected in a fluid-directing manner to the valve arrangement 17 at a first partial circuit inlet 18a and at a first partial circuit outlet 18b. In addition, the exterior heat exchanger 13 is able to be flowed around via a bypass line 19. The bypass line 19 is connected here at a bypass inlet 19a to the first partial circuit line 18 and at a bypass outlet 19b with the valve arrangement 17 in a fluid-directing manner. In the second partial circuit 9b, the evaporator 15 and the chiller 16 are connected to one another via a second partial circuit line 20 in a fluid-directing and parallel manner. The second partial circuit line 20 is connected at a second partial circuit inlet 20a and at a second partial circuit outlet 20b with the valve arrangement 17 in a fluid-directing manner. In the valve arrangement 17 here the second partial circuit outlet 20b is always connected fluidically with the first partial circuit inlet 18a.

Via the valve arrangement 17, the partial circuits 9a and 9b can be interconnected with one another in a differing manner and thereby the heat pump system 1 can be operated in differing operating modes. The individual operating modes are explained more closely in the following with the aid of FIG. 2-4.

Figure 5:
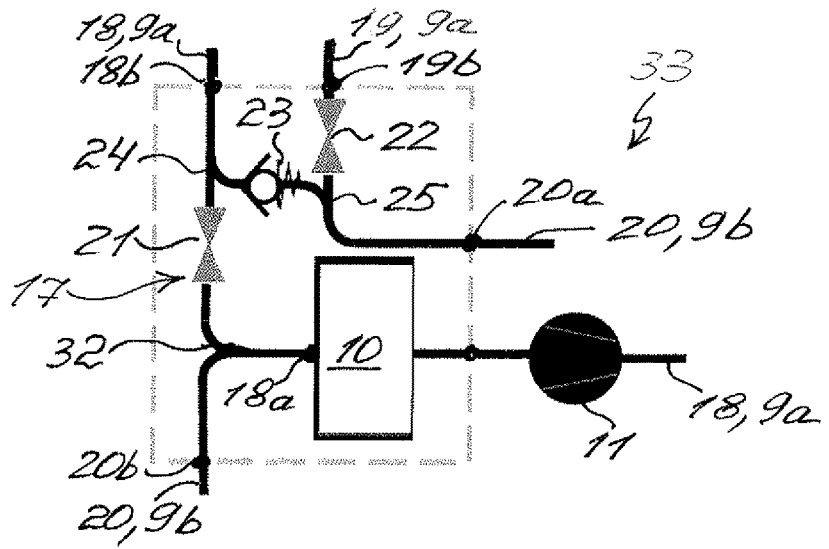

The valve arrangement 17 per se can be realized in a differing manner. In FIG. 1 the valve arrangement 17 is shown in a first embodiment and has a first 2/1-way valve 21, a second 2/1-way valve 22 and a non-return valve 23. The first 2/1-way valve 21 interconnects the first partial circuit outlet 18b and the first partial circuit inlet 18a with one another. The second 2/1-way valve 22 interconnects the bypass outlet 19b and the second partial circuit inlet 20a with one another. The non-return valve 23 connects fluidically with one another a connection point 24, arranged upstream of the first 2/1-way valve 21 and a connection point 25 arranged downstream of the second 2/1-way valve. In addition, the second partial circuit outlet 20b is fluidically connected at a connection point 32, arranged downstream of the first 2/1-way valve 21, with the first partial circuit inlet 18a. The individual valves 21, 22 and 23 of the valve arrangement 17 can be securely connected to the low pressure accumulator 10 or respectively can be flanged onto the low pressure accumulator 10, so that a structurally cohesive structural unit 33 is formed. The valve arrangement 17 in the first embodiment is also shown in FIG. 5.

Figure 2:
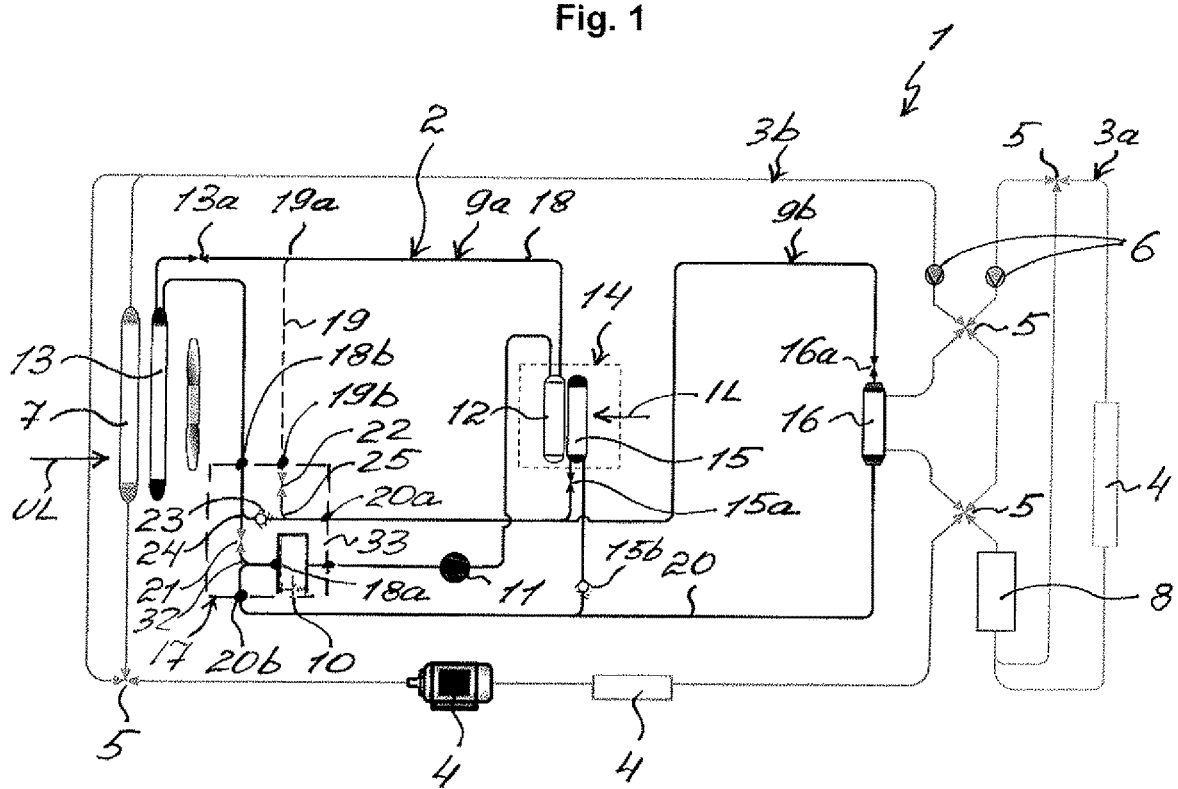
FIG. 2 a circuit diagram of a heat pump system according to the invention in a cooling mode.

FIG. 2 shows a circuit diagram of the heat pump system 1 according to the invention in a cooling mode. In the cooling mode, the expansion valve 13a is opened in a throttle-free manner and the expansion valves 15a and 16a form respectively a throttle. The 2/1-way valves 21 and 22 are closed. Thereby, the first partial circuit outlet 18b is fluidically connected via the non-return valve 23 with the second partial circuit inlet 20a, and the second partial circuit outlet 20b is fluidically connected with the first partial circuit inlet 18a. The bypass line 19 is closed. In FIG. 2, regions of the refrigerant circuit 2 which are not flowed through are represented by broken lines.

The refrigerant flows through the compressor 11 and is compressed. In the cooling mode, the heat pump heater 12 is switched off and no heat exchange takes place between the refrigerant and the interior air IL via the heat pump heater 12. As the bypass line 19 is closed, the refrigerant flows after the heat pump heater 12 via the expansion valve 13a, which is opened in a throttle-free manner, into the exterior heat exchanger 13. In the exterior heat exchanger 13, the refrigerant emits heat to the ambient air UL and is liquefied. Subsequently, the refrigerant is directed through the valve arrangement 17 from the first partial circuit outlet 18b via the non-return valve 23 to the second partial circuit inlet 20a to the evaporator 15 and to the chiller 16. The refrigerant is throttled through the expansion valves 15a and 16a and a transition takes place to the low pressure and to the lower temperature. Thereby, the refrigerant can evaporate in the evaporator 15 and in the chiller 16 with the corresponding heat absorption. As a result, the coolant of the two coolant circuits 3a and 3b in the chiller and the interior air IL of the air-conditioning system 14 are cooled in the evaporator 15. Subsequently, the refrigerant flows out from the chiller 16 and from the evaporator 15 to the second partial circuit outlet 20b and is directed through the valve arrangement 17 to the second partial circuit inlet 18a and thereby into the first partial circuit 9a.

Figure 3:
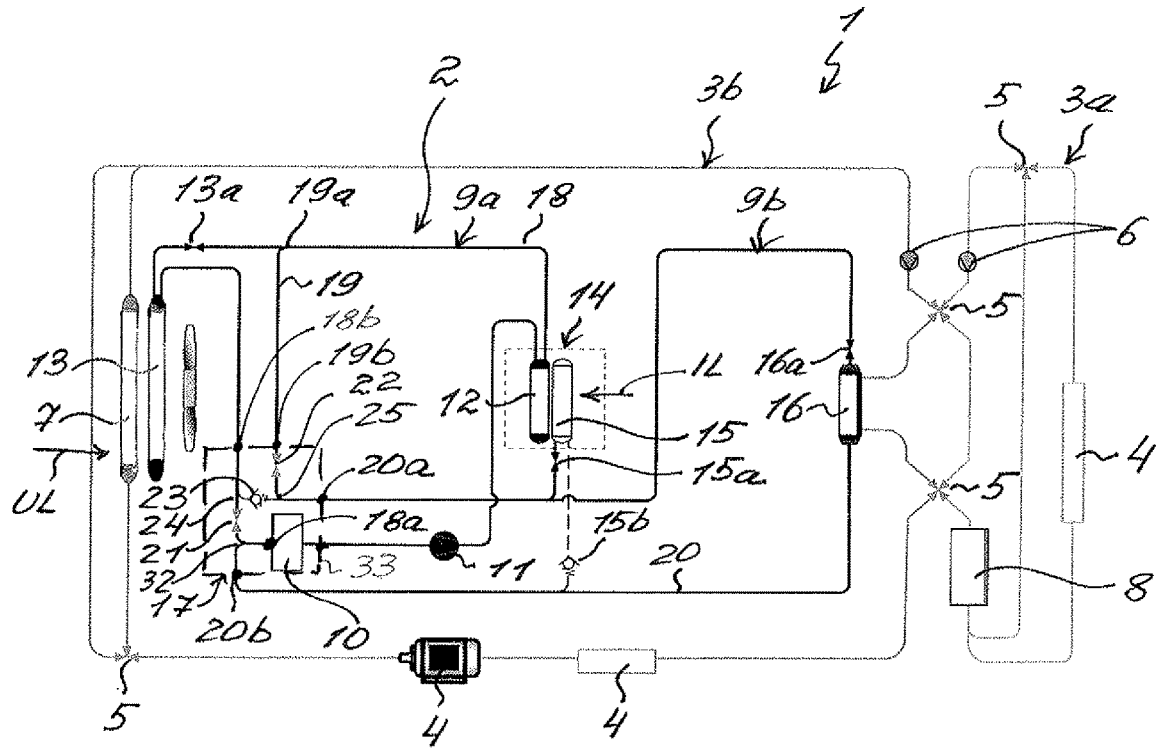
FIG. 3 a circuit diagram of a heat pump system according to the invention in a first heating mode.

FIG. 3 shows a circuit diagram of the heat pump system 1 according to the invention in a first heating mode. In the first heating mode, the expansion valve 13a and the expansion valve 16a form respectively a throttle. The expansion valve 15a is closed. The 2/1-way valves 21 and 22 are opened. Thereby, the bypass outlet 19b is fluidically connected with the second partial circuit inlet 20a. In addition, the first partial circuit outlet 18b and the second partial circuit outlet 20b are fluidically connected with the first partial circuit inlet 18a. In FIG. 3, regions of the refrigerant circuit 2 which are not flowed through are represented by broken lines.

The refrigerant flows through the compressor 11 and is compressed. Thereafter, the refrigerant flows at a high pressure and at a high temperature into the heat pump heater 12. The heat pump heater 12 serves here as a condenser in which the refrigerant condenses and emits heat to the interior air IL. Thereafter, the refrigerant flows further to the bypass inlet 19a. As the expansion valve 13a forms a throttle and the bypass line 19 is opened, the refrigerant is divided at the bypass inlet 19a. A first part of the refrigerant flows via the bypass line 19 and is directed through the valve arrangement 17 to the second partial circuit inlet 20a. The first part of the refrigerant is then throttled via the expansion valve 16a and evaporates in the chiller 16 with corresponding heat absorption. Thereby, the coolant is cooled in the coolant circuits 3a and 3b. The evaporator 15 is not flowed through here. Subsequently, the refrigerant flows to the second partial circuit outlet 20b and is directed through the valve arrangement 17 to the first partial circuit inlet 18a and further into the first partial circuit 9a. A second part of the coolant is throttled via the expansion valve 13a and subsequently evaporates in the exterior heat exchanger 13. Thereafter, the refrigerant flows to the first partial circuit outlet 18b. Owing to the pressure difference, the non-return valve 23 remains closed and the refrigerant flows to the first partial circuit inlet 18a and further into the first partial circuit 9a.

Figure 4:
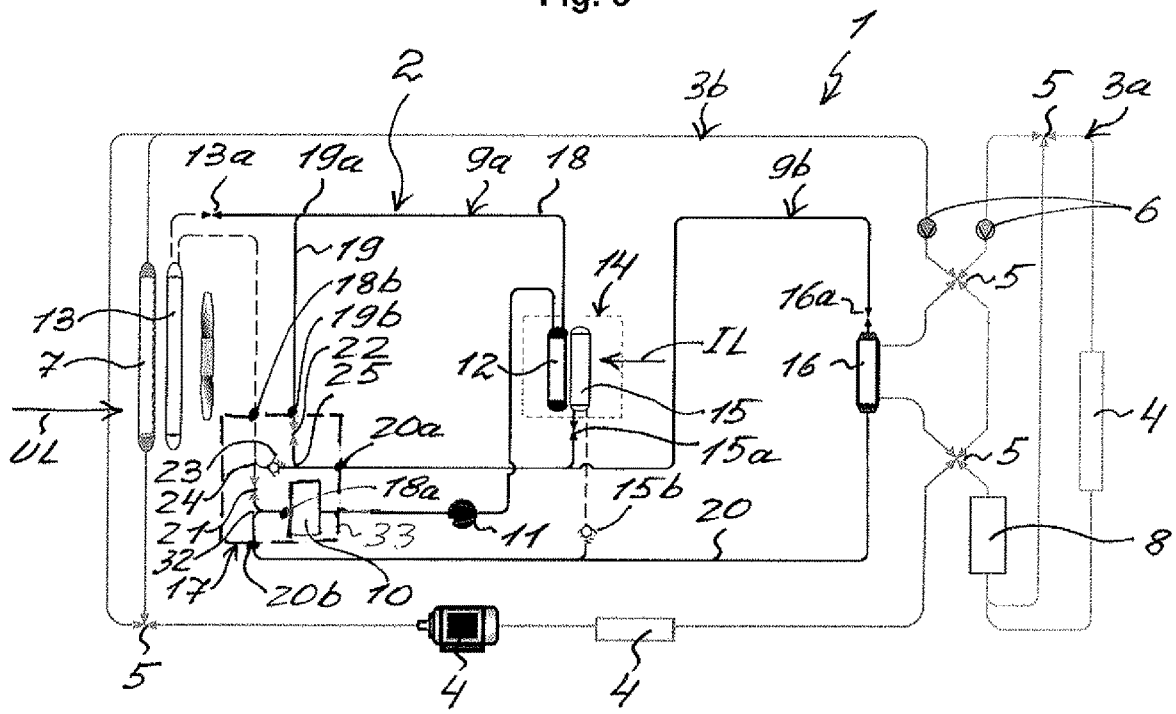
FIG. 4 a circuit diagram of a heat pump according to the invention in a second heating mode.

FIG. 4 shows a circuit diagram of the heat pump system 1 according to the invention in a second heating mode. In the second heating mode, the expansion valve 13a and the expansion valve 15a are closed at the evaporator. The expansion valve 16a forms a throttle. The 2/1-way valve 21 is closed and the 2/1-way valve 22 is opened. Thereby, the bypass outlet 19b is fluidically connected to the second partial circuit inlet 20a. In FIG. 4, regions of the refrigerant circuit 2 which are not flowed through are represented by broken lines.

In the second heating mode, the expansion valve 13a and thereby the first partial circuit outlet 18b is closed. In contrast to the first heating mode, the complete refrigerant flows via the bypass line 19 to the bypass outlet 19b. Otherwise, the second heating mode corresponds to the first heating mode according to FIG. 3.

FIG. 5 shows a view of the valve arrangement 17 in the first embodiment in the structural unit 33. As explained in detail with the aid of FIG. 2-4, the valve arrangement 17 in the first embodiment has two 2/1-way valves 21 and 22 and the non-return valve 23. In order to avoid repetitions, reference is to be made at this point to the above remarks. The valves 21, 22 and 23 of the valve arrangement 17 are flanged onto the low pressure accumulator 10, so that the structurally cohesive structural unit 33 is formed.

Figure 6:
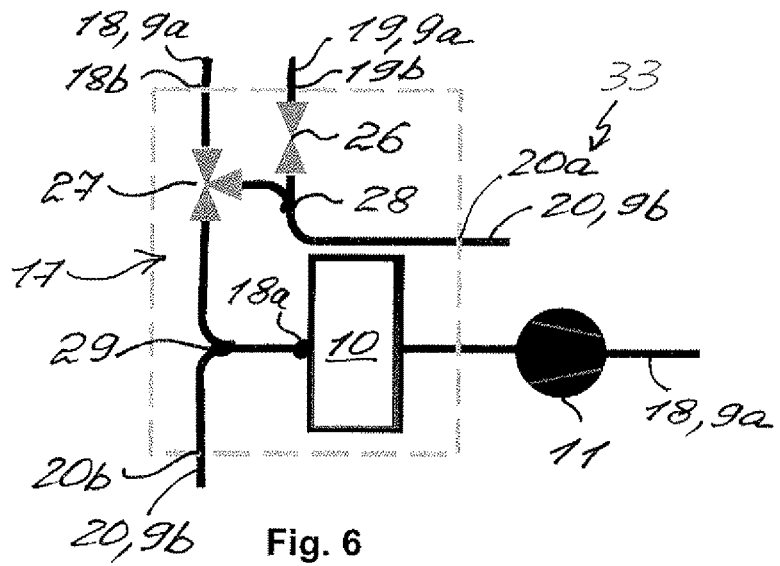

FIG. 6 shows a view of the valve arrangement 17 in a second embodiment in the structural unit 33. The valve arrangement 17 has here a 2/1-way valve 26 and a 3/2-way valve 27. The 2/1-way valve 26 interconnects the bypass outlet 19b and the second partial circuit inlet 20a with one another. The 3/2-way valve 27 interconnects the first partial circuit outlet 18b, the first partial circuit inlet 18a and a connection point 28, arranged downstream of the 2/1-way valve 26, at the second partial circuit line 20 with one another. In addition, the second partial circuit outlet 20b is fluidically connected with the first partial circuit inlet 18a at a connection point 29 arranged downstream of the 3/2-way valve 27.

Figure 7:
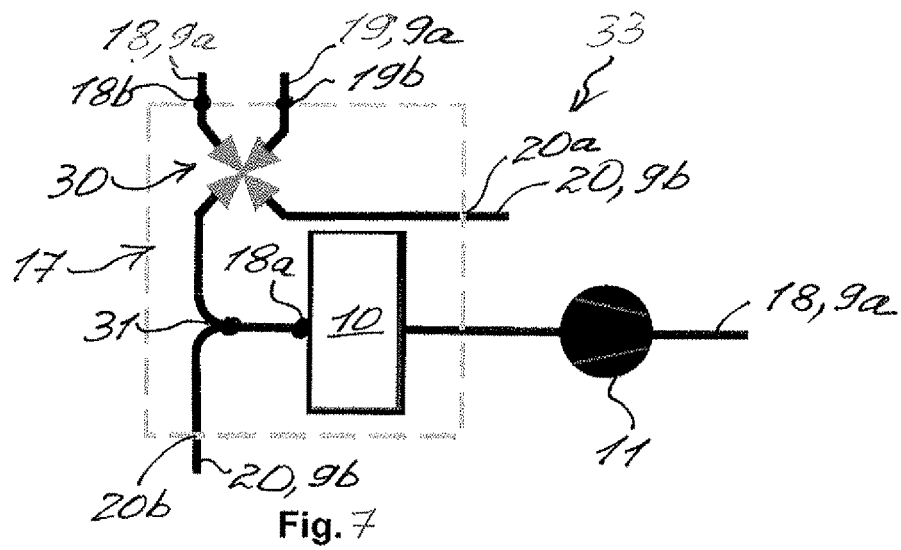
FIGS. 5 to 7 views of a differently configured valve arrangement in the heat pump system according to the invention.

FIG. 7 shows a view of the valve arrangement 17 in a third embodiment in the structural unit 33. The valve arrangement 17 has here a 4-way valve 30. The 4-way valve 30 interconnects the first partial circuit outlet 18b, the first partial circuit inlet 18a, the bypass outlet 19b and the second partial circuit inlet 20a with one another. In addition, the second partial circuit outlet 20b is fluidically connected with the first partial circuit inlet 18a at a connection point 31 arranged downstream of the 4-way valve 30.

It shall be understood that the operating modes described above in FIG. 2-4 are able to be realized in an identical manner with the embodiments of the valve arrangement 17 shown in FIG. 5-7.

The invention claimed is:

1. A heat pump system for a motor vehicle, comprising:
a refrigerant circuit that is flowable through by a refrigerant,
the refrigerant circuit having a first partial circuit with a low pressure accumulator, a compressor, a heat pump heater and an exterior heat exchanger,
the refrigerant circuit having a second partial circuit with an evaporator and a chiller,
wherein the refrigerant circuit has a valve arrangement, and the first partial circuit and the second partial circuit are fluidically connected with one another exclusively via the valve arrangement, and
wherein the valve arrangement comprises at least one valve and lines of the refrigerant circuit interconnected with one another in a structural unit.

2. The heat pump system according to claim 1, wherein:
in the first partial circuit the low pressure accumulator, the compressor, the heat pump heater and the exterior heat exchanger are connected with one another in a fluid-directing and serial manner via a first partial circuit line,
the first partial circuit line is connected in a fluid-directing manner with the valve arrangement at a first partial circuit inlet arranged upstream of the low pressure accumulator and at a first partial circuit outlet arranged downstream of the exterior heat exchanger,
in the first partial circuit the exterior heat exchanger flowable around via a bypass line, and
the bypass line is connected at a bypass inlet, arranged upstream of the exterior heat exchanger to the first partial circuit line and at a bypass outlet with the valve arrangement in a fluid-directing manner.

3. The heat pump system according to claim 1, wherein:
in the second partial circuit the evaporator and the chiller are connected with one another in a fluid-directing and parallel manner via a second partial circuit line, and
the second partial circuit line is connected with the valve arrangement in a fluid-directing manner at a second partial circuit inlet arranged upstream of the evaporator and the chiller, and at a second partial circuit outlet arranged downstream of the evaporator and the chiller.

4. The heat pump system according to claim 2, further comprising at least one of:
a regulatable expansion valve arranged directly upstream of the exterior heat exchanger,
a regulatable expansion valve arranged directly upstream of the evaporator, and
a regulatable expansion valve arranged directly upstream of the chiller.

5. The heat pump system according to claim 4, wherein the heat pump system is operable in a cooling mode, wherein:
in the cooling mode, the regulatable expansion valve arranged upstream of the exterior heat exchanger is opened in a throttle-free manner at the exterior heat exchanger; and the regulatable expansion valve at the evaporator and the regulatable expansion valve at the chiller respectively form a throttle, and
in the cooling mode, the bypass line in the first partial circuit is closed through the valve arrangement; the first partial circuit outlet is fluidically connected to a second partial circuit inlet; and a second partial circuit outlet is fluidically connected to the first partial circuit inlet.

6. The heat pump system according to claim 4, wherein the heat pump system is operable in a first heating mode, wherein
in the first heating mode, the regulatable expansion valve at the exterior heat exchanger and the regulatable expansion valve at the chiller respectively form a throttle; and the regulatable expansion valve at the evaporator is closed, and in the first heating mode, the bypass outlet is fluidically connected with a second partial circuit inlet through the valve arrangement; and the first partial circuit outlet and a second partial circuit outlet are fluidically connected to the first partial circuit inlet.

7. The heat pump system according to claim 4, wherein the heat pump system is operable in a second heating mode, wherein:

in the second heating mode, the regulatable expansion valve at the exterior heat exchanger and the first partial circuit outlet are closed; the regulatable expansion valve is closed at the evaporator; and the regulatable expansion valve at the chiller forms a throttle, and in the second heating mode, through the valve arrangement the bypass outlet is fluidically connected with a second partial circuit inlet; and a second partial circuit outlet is fluidically connected to the first partial circuit inlet.

8. The heat pump system according to claim 2, wherein:
the at least one valve of the valve arrangement includes a first 2/1-way valve, a second 2/1-way valve and a non-return valve,
the first 2/1-way valve interconnects the first partial circuit outlet and the first partial circuit inlet with one another,
the second 2/1-way valve interconnects the bypass outlet and a second partial circuit inlet with one another,
the non-return valve fluidically connects a first connection point, arranged upstream of the first 2/1-way valve, and a second connection point, arranged downstream of the second 2/1-way valve, and
a second partial circuit outlet is fluidically connected with the first partial circuit inlet at a third connection point arranged downstream of the first 2/1-way valve.

9. The heat pump system according to claim 2, wherein:
the at least one valve of the valve arrangement includes a 2/1-way valve and a 3/2-way valve,
the 2/1-way valve interconnects the bypass outlet and a second partial circuit inlet with one another,
the 3/2-way valve interconnects with one another the first partial circuit outlet, the first partial circuit inlet and a first connection point arranged downstream of the 2/1-way valve, and
a second partial circuit outlet is fluidically connected with the first partial circuit inlet at a second connection point arranged downstream of the 3/2-way valve.

10. The heat pump system according to claim 2, wherein:
the at least one valve of the valve arrangement includes a 4-way valve,
the 4-way valve interconnects with one another the first partial circuit outlet, the first partial circuit inlet, the bypass outlet and a second partial circuit inlet, and
a second partial circuit outlet is fluidically connected with the first partial circuit inlet at a connection point arranged downstream of the 4-way valve.

11. The heat pump system according to claim 1, wherein the structural unit is securely connected with the low pressure accumulator.

12. A motor vehicle, comprising:
a heat pump system, the heat pump system including a refrigerant circuit;
the refrigerant circuit having a first partial circuit with a low pressure accumulator, a compressor, a heat pump heater, and an exterior heat exchanger;

the refrigerant circuit having a second partial circuit with an evaporator and a chiller;
the refrigerant circuit having a valve arrangement;
wherein the first partial circuit and the second partial circuit are fluidically connected with one another exclusively via the valve arrangement; and
wherein the valve arrangement comprises at least one valve and lines of the refrigerant circuit interconnected with one another in a structural unit.

13. The motor vehicle according to claim 12, wherein:
in the first partial circuit the low pressure accumulator, the compressor, the heat pump heater and the exterior heat exchanger are connected with one another in a fluid-directing and serial manner via a first partial circuit line;
the first partial circuit line is connected in a fluid-directing manner with the valve arrangement at a first partial circuit inlet arranged upstream of the low pressure accumulator and at a first partial circuit outlet arranged downstream of the exterior heat exchanger;
in the first partial circuit the exterior heat exchanger flowable around via a bypass line; and
the bypass line is connected at a bypass inlet, arranged upstream of the exterior heat exchanger to the first partial circuit line and at a bypass outlet with the valve arrangement in a fluid-directing manner.

14. The motor vehicle according to claim 13, wherein:
in the second partial circuit the evaporator and the chiller are connected with one another in a fluid-directing and parallel manner via a second partial circuit line; and
the second partial circuit line is connected with the valve arrangement in a fluid-directing manner at a second partial circuit inlet arranged upstream of the evaporator and the chiller, and at a second partial circuit outlet arranged downstream of the evaporator and the chiller.

15. The motor vehicle according to claim 14, wherein the heat pump system includes:
a first regulatable expansion valve arranged directly upstream of the exterior heat exchanger;
a second regulatable expansion valve arranged directly upstream of the evaporator; and
a third regulatable expansion valve arranged directly upstream of the chiller.

16. The motor vehicle according to claim 15, wherein the heat pump system is operable in a cooling mode, wherein:
in the cooling mode, the first expansion valve is opened in a throttle-free manner at the exterior heat exchanger, and the second expansion valve and the third expansion valve respectively form a throttle; and
in the cooling mode, the bypass line in the first partial circuit is closed through the valve arranged, the first partial circuit outlet is fluidically connected to the second partial circuit inlet, and the second partial circuit outlet is fluidically connected to the first partial circuit inlet.

17. The motor vehicle according to claim 15, wherein the heat pump system is operable in at least one of a first heating mode and a second heating mode, wherein:
in the first heating mode, the first expansion valve and the third expansion valve respectively form a throttle, and the second expansion valve is closed;
in the first heating mode, the bypass outlet is fluidically connected with the second partial circuit inlet through the valve arrangement, and the first partial circuit outlet and the second partial circuit outlet are fluidically connected to the first partial circuit inlet;

in the second heating mode, the first expansion valve and the first partial circuit outlet are closed, the second expansion valve is closed, and the third expansion valve forms a throttle, and in the second heating mode, through the valve arrangement the bypass outlet is fluidically connected with the second partial circuit inlet, and the second partial circuit outlet is fluidically connected to the first partial circuit inlet.

18. The motor vehicle according to claim 13, wherein:

the at least one valve of the valve arrangement includes a 2/1-way valve and a 3/2-way valve;

the 2/1-way valve interconnects the bypass outlet and the second partial circuit inlet with one another;

the 3/2-way valve interconnects with one another the first partial circuit outlet, the first partial circuit inlet and a first connection point arranged downstream of the 2/1-way valve; and the second partial circuit outlet is fluidically connected with the first partial circuit inlet at a second connection point arranged downstream of the 3/2-way valve.

19. The motor vehicle according to claim 13, wherein:

the at least one valve of the valve arrangement includes a 4-way valve;

the 4-way valve interconnects with one another the first partial circuit outlet, the first partial circuit inlet, the bypass outlet and the second partial circuit inlet; and the second partial circuit outlet is fluidically connected with the first partial circuit inlet at a connection point arranged downstream of the 4-way valve.

20. A heat pump system for a motor vehicle, comprising:

a refrigerant circuit that is flowable through by a refrigerant;

the refrigerant circuit having a first partial circuit with a low pressure accumulator, a compressor, a heat pump heater and an exterior heat exchanger;

the refrigerant circuit having a second partial circuit with an evaporator and a chiller;

the refrigerant circuit including a valve arrangement with at least one valve, and the first partial circuit and the second partial circuit are fluidically connected with one another exclusively via the valve arrangement;

in the first partial circuit the low pressure accumulator, the compressor, the heat pump heater and the exterior heat exchanger are connected with one another in a fluid-directing and serial manner via a first partial circuit line;

the first partial circuit line is connected in a fluid-directing manner with the valve arrangement at a first partial circuit inlet arranged upstream of the low pressure accumulator and at a first partial circuit outlet arranged downstream of the exterior heat exchanger;

in the first partial circuit the exterior heat exchanger flowable around via a bypass line, and the bypass line is connected at a bypass inlet, arranged upstream of the exterior heat exchanger to the first partial circuit line and at a bypass outlet with the valve arrangement in a fluid-directing manner;

a regulatable expansion valve arranged directly upstream of the exterior heat exchanger;

a regulatable expansion valve arranged directly upstream of the evaporator;

a regulatable expansion valve arranged directly upstream of the chiller;

wherein the heat pump system is operable in a heating mode, wherein:

in the first heating mode, the regulatable expansion valve at the exterior heat exchanger and the regulatable expansion valve at the chiller respectively form a throttle; and the regulatable expansion valve at the evaporator is closed, and in the first heating mode, the bypass outlet is fluidically connected with a second partial circuit inlet through the valve arrangement; and the first partial circuit outlet and a second partial circuit outlet are fluidically connected to the first partial circuit inlet.

* * * * *